United States Patent [19]

Bow et al.

[11] 4,011,379
[45] Mar. 8, 1977

[54] ELECTRICAL INSULATION FROM LIGHTLY CHLORINATED, HIGH BULK DENSITY OLEFIN POLYMER

[75] Inventors: Kenneth E. Bow; James D. MacRae, both of Lake Jackson, Tex.

[73] Assignee: The Dow Chemical Company, Midland, Mich.

[22] Filed: May 22, 1975

[21] Appl. No.: 580,095

[52] U.S. Cl. .............................. 526/22; 204/159.17; 427/36; 427/120; 428/402; 526/43
[51] Int. Cl.² ..................... C08F 8/22; C08F 10/02; C08F 110/02
[58] Field of Search ................ 260/94.9 H; 526/43, 526/22; 428/402; 204/159.17

[56] References Cited

UNITED STATES PATENTS

| | | | |
|---|---|---|---|
| 2,890,213 | 6/1959 | Nolske | 260/94.9 H |
| 3,549,866 | 12/1970 | Truschmann et al. | 260/94.9 H |
| 3,627,658 | 12/1971 | Ryffel | 260/94.9 H X |

FOREIGN PATENTS OR APPLICATIONS

| | | | |
|---|---|---|---|
| 834,905 | 5/1960 | United Kingdom | 260/94.9 |
| 1,228,922 | 3/1971 | United Kingdom | 260/94.9 |

Primary Examiner—William F. Hamrock
Attorney, Agent, or Firm—Ronald G. Brookens

[57] ABSTRACT

The invention pertains to electrical insulation formed from a normally solid, linear olefin polymer containing from about 1 to about 20 percent by weight of chlorine chemically combined therewith, said polymer having a bulk density of from about 22 to about 36 pounds per cubic foot and wherein the individual polymer particles are predominantly in the range of from about 300 to about 800 microns in size, a melt index of from about 0.05 to about 2 as determined by ASTM Test No. D1238, Procedure A and a tensile yield strength of greater than about 1000 p.s.i. The specified polymers have enhanced processability as compared to conventionally used nonchlorinated or highly chlorinated olefin polymers and may be effectively dry blended with additives such as stabilizers, blowing agents and fillers. Electrical insulation formed from such polymers is characterized by smooth surfaces, high stress crack resistance and excellent electrical properties as well as unexpectedly improved response to cross-linking by exposure to atomic radiation, with resultant high resistance to thermal and/or oxidative-induced degradation.

4 Claims, 6 Drawing Figures

EFFECT OF MOLECULAR WEIGHT DISTRIBUTION (AS MEASURED BY $I_{10}/I_2$ RATIO) ON SURFACE ROUGHNESS

ELECTRICAL INSULATION FROM LIGHTLY CHLORINATED, HIGH BULK DENSITY OLEFIN POLYMER

BACKGROUND OF THE INVENTION

Polymeric electrical insulation for electrical conductors, e.g. as coatings for aerial drop wire, appliance wire, hookup wire and ignition wire requires, in addition to excellent electrical properties such as low dielectric constant and dissipation factor, the ability to be processed at high rates of shear and at high speeds into electrically insulating coatings having smooth surfaces and high stress crack resistance. Prior used nonchlorinated or highly chlorinated polyethylenes, i.e., polyethylenes containing at least about 30 percent by weight chlorine as well as polyethylenes containing minor amounts of a modifying polymer such as polypropylene (as described in U.S. Pat. No. 3,355,520); are difficulty processable and are characterized by relatively high power requirements, even at low line speeds, when being formed into electrical insulation for wire. Dry blending of additives such as stabilizers, blowing agents and fillers and the like has also proven to be ineffective when using prior used olefin polymers for extrusion coated electrical wire insulation having adequate surface smoothness and stress crack resistance.

Further, electrical insulation requires high resistance to thermal and/or oxidative induced degradation. In this regard, a material such as polyvinyl chloride (PVC), when irradiated with sufficient energy to provide thermal resistance, exhibits excessive degradation which makes it brittle and highly susceptible to oxidative degradation. Materials such as neoprene and chlorosulfonated polyethylene, when cross-linked, also become deficient in thermal stability and lose their flexibility upon aging. The problem of degradation of PVC may be overcome to some degree by the addition of added sensitizing monomer which enhances the cross-linking efficiency of such material. However, since such monomers are expensive and must be uniformly incorporated into the PVC, economics of the insulation are affected adversely. For olefin polymers cross-linking occurs due to abstraction of hydrogen atoms from molecules in the polymer chain. This abstraction of hydrogen form sites which join together instantaneously to form permanent bonds between adjacent polymer chains. In general, the irradiation efficiency of polyethylenes needs improvement and added sensitizing monomers have been used for this purpose with accompanying economic disadvantages.

It is a primary object of the present invention to provide electrical insulation formed from certain lightly chlorinated, high bulk density, linear olefin polymers which olefin polymers are characterized by improved processability and which may thus be processed at high shear rates and at high speeds into electrical insulation for wire and the like, such insulation having smooth surfaces and high stress crack resistance.

It is a further object to provide such electrical insulation wherein necessary additives such as stabilizers, blowing agents and fillers may be advantageously dry blended with said olefin polymer prior to processing of such polymer into electrical insulation.

It is another object to provide electrical insulation having excellent electrical properties and, in addition, enhanced response to cross-linking by exposure to atomic radiation, even in the absence of added sensitizing monomers, and which are characterized by exceptionally high resistance to thermal and/or oxidative induced degradation.

SUMMARY OF THE INVENTION

The above and related objects are accomplished by utilization of electrical insulation formed from a normally solid, linear olefin polymer containing from about 1 to about 20 percent by weight of chlorine chemically combined therewith said polymer having a bulk density of from about 22 to about 36 pounds per cubic foot and wherein the individual particles of said polymer are predominantly in the range of from about 300 to about 800 microns in size, said polymer additionally being characterized by a melt index of from about 0.05 to about 2 as determined by ASTM Test No. D-1238, Procedure A and a tensile yield strength of greater than about 1000 p.s.i.

DESCRIPTION OF THE PREFERRED EMBODIMENT

Figure 1:
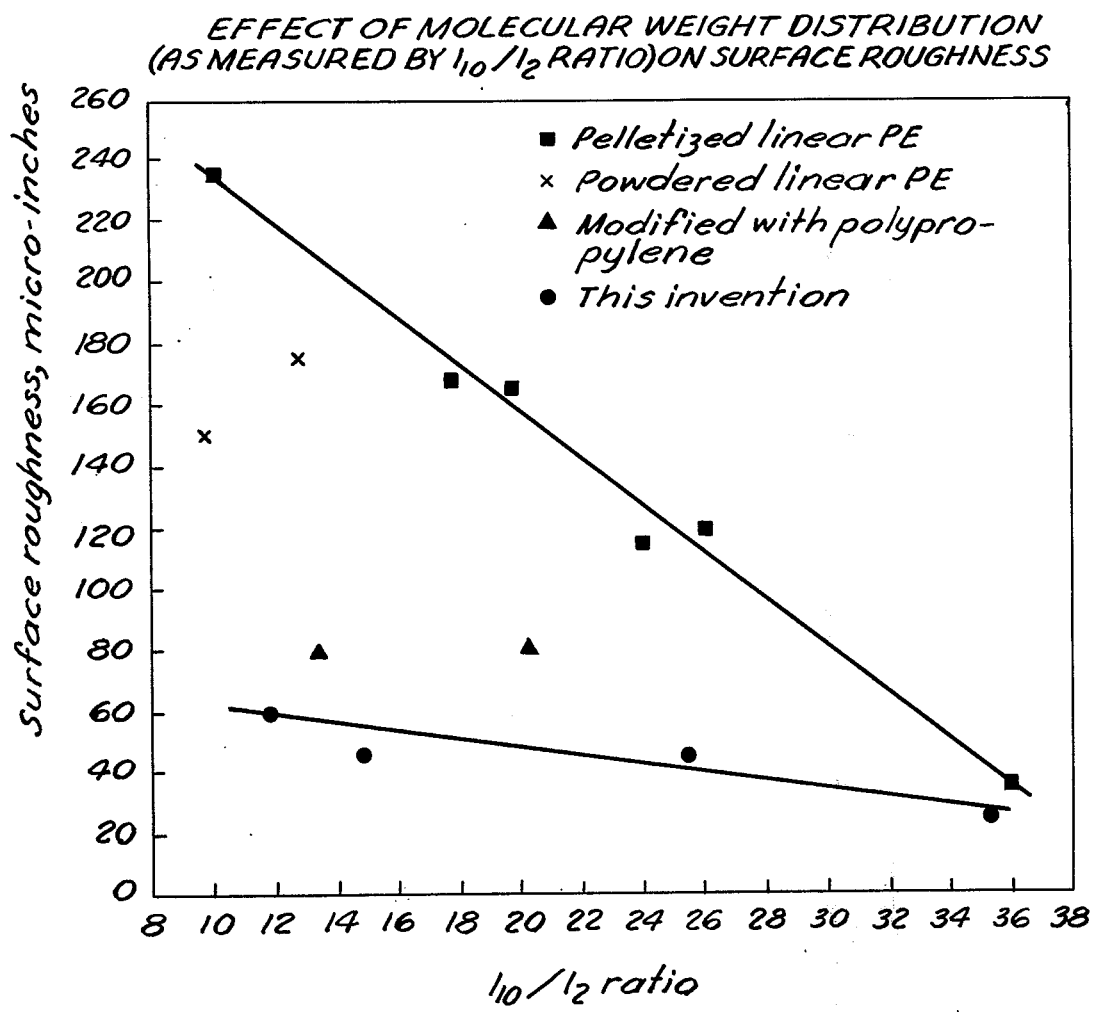

For purposes of this invention, the term "olefin polymer" means homopolymers of ethylene and copolymers of ethylene and up to about 5 weight percent of an aliphatic, hydrocarbon α-monoolefin such as propylene-1 and butene-1 containing from about 1 to about 20, and preferably from about 2.5 to about 12 percent by weight of chlorine chemically combined therewith.

The olefin polymers employed in the practice of this invention are further characterized by being in the form of normally extrudable, free flowing powder having a bulk density in the range from about 22 to about 36 pounds/cubic foot, preferably from about 25 to about 32 pounds/cubic foot. The particles of such powder are free flowing, porous particles having individual sizes predominantly within the range from at least 300 to about 800 microns, preferably wherein at least about 90 percent of which are in the range of from 300 to about 600 microns and having generally roughened surfaces resulting from their agglomerate-like structure. Uniquely, the particles of this powder have substantial open or free space within the particles themselves. On the average, as much as about 50 volume percent and as little as about 20 volume percent based on total particle volume is free or open space occurring as pockets within the particles and as pores or openings on the particle surfaces. Preferred olefin polymer powders have flowability measured as angle of repose in the range from about 24° to about 28° and an open space (or free volume) within individual particles in the range of from about 25 to about 45 volume percent based on total particle volume. Especially preferred powders also have surface areas in the range from about 2 to 4 square meters/gram.

For commercial purposes, the chlorination of such olefin polymers may be effected in various ways. It is possible, for example, to agitate the granular polymer by means of stirring devices while exposing it to the action of a current of chlorine, in the substantial absence of oxygen, wherein the chlorine has preferably been preheated.

It is particularly advantageous to effect the chlorination by a fluidized process wherein the olefin polymer is maintained, with substantially complete mixing occurring within a period of about 10 seconds, in a fluidized bed state, e.g., by means of the gas used for the chlorination and wherein the temperature of reaction does not substantially exceed 90° C. It is to be understood that the chlorine gas may be diluted with inert gases, if desired, and that the incoming fluidizing gas and/or the olefin polymer particles may be preheated. It has been found, however, that the presence of substantial aounts of oxygen during the chlorination reaction will significantly deleteriously affect the rate and degree of chlorination as well as the physical properties of the resulting chlorinated material.

The following specific example illustrates the invention but should not be considered as limiting its scope. All parts and percentages are by weight unless otherwise indicated.

EXAMPLE

A. Preparation of High Bulk Density Polyethylene Powder

A polyethylene powder having a bulk density of about 30 lbs/ft.$^3$ was obtained by polymerizing ethylene under low pressures, i.e., less than about 30 atmospheres, and a slurry polymerization temperature of less than about 100° C. in the presence of trialkyl aluminum and a titanium containing component which had been prepared from titanium tetrachloride and diethyl aluminum monochloride. In preparation of the titanium-containing catalyst, titanium tetrachloride, dissolved in an inert hydrocarbon solvent, was reacted using thorough stirring with diethyl aluminum monochloride also dissolved in inert hydrocarbon solvent in a manner such that the molar ratio of titanium tetrachloride to diethyl aluminum monochloride was at any time prior to reaction of all titanium tetrachloride at least 1; the reaction product was then washed with inert hydrocarbon solvent and filtered to remove hydrocaron-solvent-soluble impurities; and the washed reaction product activated by adding trialkyl aluminum in amount such that the molar ratio of trialkyl aluminum and titanium-containing reaction product was from about 0.3:1 to about 3:1 in the resulting catalyst. The polymerization mixture was agitated at a rate of about 140 rpm. A polymer product in the form of a slurry was withdrawn from the reactor and the polymer particles thereof recovered (by steam distillation and drying in an air slick). Examination of the polymer particles with an electron scanning micrograph confirmed all of such particles as being generally porous, partially fused agglomerates of much smaller particles, the agglomerates having rough surfaces. Screen analysis of the polymer particles indicates a particle size distribution in weight percent of total powder at the designated particle size as follows:

1.6–14.3% greater than 540 microns
72.3–87.6% from about 320 to about 540 microns
4.7–20.1% from about 248 to about 320 microns
0.8–3.3% from about 175 to about 248 microns
0.1–0.6% from about 147 to about 175 microns
0.2–1.2% less than about 147 microns B. Chlorination of the High Bulk Density Polyethylene Powder The high bulk density polyethylene powder was chlorinated by fluidizing such material in a suitable container by passing an inert gas (nitrogen or other gas) through the material, in the substantial absence of oxygen, then adding chlorine to the fluidizing gas. In each instance, the reaction was conducted at a temperature not exceeding 90° C for a time sufficient to provide from about 2.5 to about 9.5 percent by weight of chemically combined chlorine on the polymer particles. Examination of electron photomicrographs of the resulting polymeric material established that the chlorine was heterogeneously attached substantially to the outer surfaces of the polyethylene polymer particles. The following Table I sets forth the properties of the chlorinated polymers prepared as well as several nonchlorinated polyethylenes prepared as described in (A) above.

TABLE I
PHYSICAL PROPERTY DATA

| Sample | Percent Chlorine | Melt Index | Elongation, Percent | Tensile Yield (psi) | Base Resin |
|---|---|---|---|---|---|
| This Invention | | | | | |
| 1 | 2.5 | .55 | 750 | 3750 | 9 |
| 2 | 2.7 | .21 | 750 | 2750 | 8 |
| 3 | 5.4 | .28 | 625 | 3430 | 9 |
| 4 | 6.4 | .06 | 600 | 3700 | 8 |
| 5 | 7.6 | .14 | 550 | 3920 | 9 |
| 6 | 8.7 | .11 | 475 | 2465 | 9 |
| 7 | 9.5 | .32 | 475 | 2300 | 10 |
| For Comparison | | | | | |
| 8 | 0 | .3 | 1110 | 4240 | NA[1] |
| 9 | 0 | .64 | 950 | 4210 | NA |
| 10 | 0 | 1.2 | 750 | 4350 | NA |

[1]Not applicable

C. Preparation and Evaluation of Electrical Insulation

The primary characteristic of an electrical wire insulation is its ability to process at high rates of shear and high speeds of coating to form stress crack resistant structures having a smooth surface. The main factors affecting the processability of a linear polyethylene are its viscosity at extrusion temperatures and its molecular weight distribution. Melt index is a measure of the flow of an olefin polymer under certain standard conditions of temperature and shear and therefore provides a measure of molecular weight or viscosity. A measure of molecular weight distribution is the ratio of melt index with a 10,000 gram weight to that of a 2160 gram weight per ASTM Test No. D-1238. This ratio is referred to as the $I_{10}/I_2$ ratio. For linear polyethylenes used for wire insulation, a high $I_{10}/I_2$ ratio is necessary for processability. A high ratio indicates a broad molecular weight distribution. A melt index ($I_2$) not greater than 0.5 is essential for an insulation based on linear non-chlorinated polyethylene in order to achieve insulating coatings with high degrees of stress crack resistance, however, the olefin polymers of this invention exhibit acceptable stress crack resistance with melt indexes of from about 0.05 up to about 2. Further, highly chlorinated polyethylenes are incapable of producing a melt index, as such materials do not flow under the specified conditions.

The processability of the olefin polymers of this invention and those of the known art were investigated with a wire line composed of commercial coating apparatus. The insulations under study were extruded onto 22 AWG copper wire using a 2½ inch 20 L/D extruder with a polyethylene 10 turn metering screw. A ¾ inch insulating crosshead with 0.026 inch tip and 0.044 inch die was used. The copper wire was preheated to about 150° F. in an induction heater and pulled through the crosshead at approximately 1000 fpm. where it was cooled in a 30 foot cooling trough containing water at 70° F. Total wire thickness was constantly monitored with a gauge located between the capstan and wire take-up. Extruder speed (rpm) was adjusted to obtain an insulation wall thickness of about 10 mils at the desired line speed. Surface roughness of each insulation was measured. An extruder temperature profile of 375° F., 400° F, 425° F, 475° F, and 475° F. was used for most runs to obtain a melt temperature of around 470° F.

The following Table II (and FIG. 1) show the effect of $I_{10}/I_2$ ratio on surface roughness for linear polyethylenes (melt indexes between 0.2 and 0.34) and the olefin polymers of this invention (melt indexes between 0.11 and 0.55).

Figure 3:
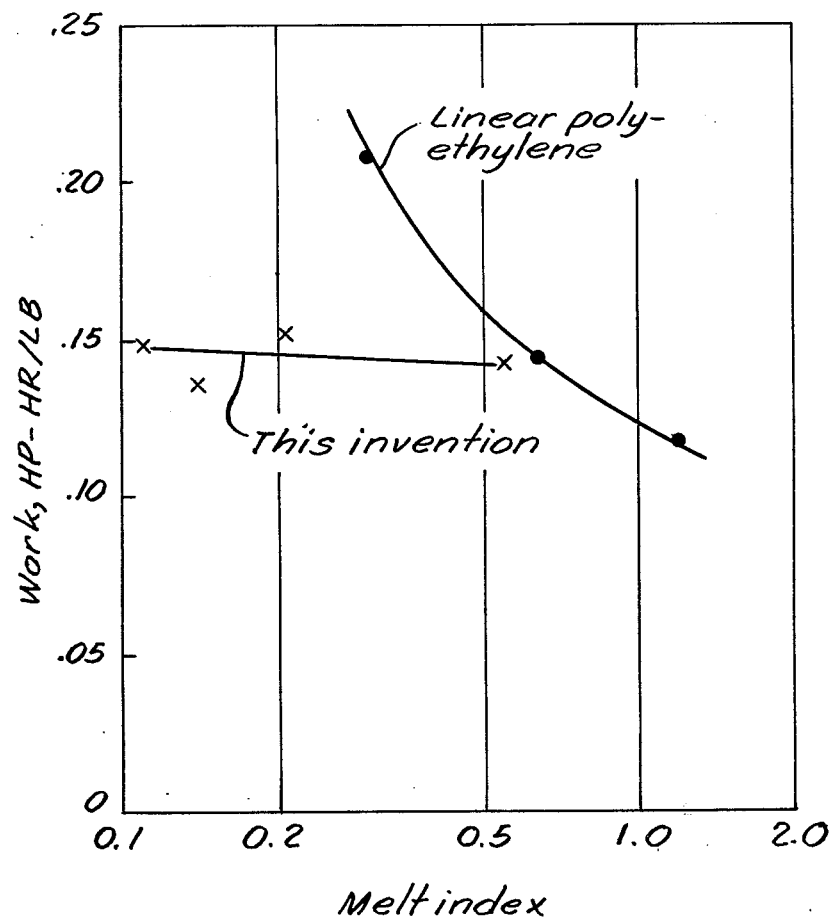

Again the wire coatings of this invention have vastly enhanced processability which would be unexpected for their melt index and molecular weight distribution. FIG. 3 illustrates the reduced power requirements of the olefin polymers of this invention versus linear polyethylene (both types of materials in powder form). Table II also shows lower die pressures for the olefin polymers of this invention versus linear polyethylenes, again for materials in powder form.

TABLE II

PROCESSABILITY AND EXTRUSION DATA

| Sample No. | Melt Index | $I_{10}/I_2$ Ratio | Die Pressure (psi) | Line Speed (fpm) | Melt (° F) | HP-HR[1] lb | Surface Roughness micro-inches |
|---|---|---|---|---|---|---|---|
| This Invention Powder Form | | | | | | | |
| 1 | .55 | 11.8 | 4800 | 1000 | 467 | .142 | 60 |
| 2 | .21 | 14.8 | 5000 | 1000 | 468 | .150 | 45 |
| 5 | .14 | 25.6 | 4800 | 1000 | 462 | .135 | 45 |
| 6 | .11 | 35.4 | 4900 | 1000 | 459 | .146 | 25 |
| For Comparison, Powder Form of Linear Polyethylene | | | | | | | |
| 8 | .30 | 12.6 | 5200 | 1000 | 465 | .207 | 175 |
| 9 | .64 | 9.7 | 5000 | 1000 | 462 | .142 | 150 |
| 11* | .60 | 13.5 | 5000 | 1000 | 469 | .134 | 80 |
| For Comparison, Pelletized Form of Linear Polyethylene | | | | | | | |
| 12 | .20 | 10.0 | 6600 | 1052 | 535 | .144 | 237 |
| 13 | .32 | 17.7 | 7000 | 1500 | 462 | — | 168 |
| 14 | .34 | 19.6 | 7300 | 1000 | 437 | — | 165 |
| 15* | .35 | 20.2 | 3300 | 1000 | 474 | — | 80 |
| 16 | .20 | 24.0 | 4200 | 848 | 470 | .098 | 115 |
| 17 | .20 | 26.0 | 4200 | 848 | 468 | .105 | 120 |
| 18 | .25 | 36.0 | 4800 | 1032 | 470 | .086 | 35 |
| For Comparison, Chlorinated Polyethylene, Pelletized Form | | | | | | | |
| 19 | NA | NA | 6500 | 518 | 340 | .202 | 70 |

*11 is Resin 9 plus 5% by weight of polypropylene.
*15 is Resin 14 plus 5% by weight of polypropylene.
Sample 19 has 0% relative crystallinity and 48% chlorine
[1]Horsepower/hour/pound The above data clearly indicate that the electrical insulation of this invention has unexpectedly enhanced processability over linear polyethylenes having similar molecular weight distributions. It is also evident that these materials have increased processability over linear polyethylenes modified by the addition of a minor amount of polypropylene as described in U.S. Pat. No. 3,355,520. To provide a comparison to the teachings of this invention, 5% by weight of polypropylene was dry blended into Sample No. 14 (granular form) and Sample No. 9 (powder form). This polypropylene was a material having a 2.04 melt flow index as powder as 2.63 as granules with a 0.9 density. When these blends were coated on wire under the same conditions as the olefin polymers of this invention, a marked improvement in surface roughness of the insulation occurred (Sample Nos. 11 and 15). However, the improvement still did not result in a level of surface smoothness equal to that of the olefin polymers of this invention.

Sample 19 of Table II, a typical electrical grade of chlorinated polyethylene was a 0% relative crystallinity and 48% chlorine level also has poor processability and vastly increased power requirements (even at lower line speeds) when compared to the olefin polymers of this invention.

Figure 2:
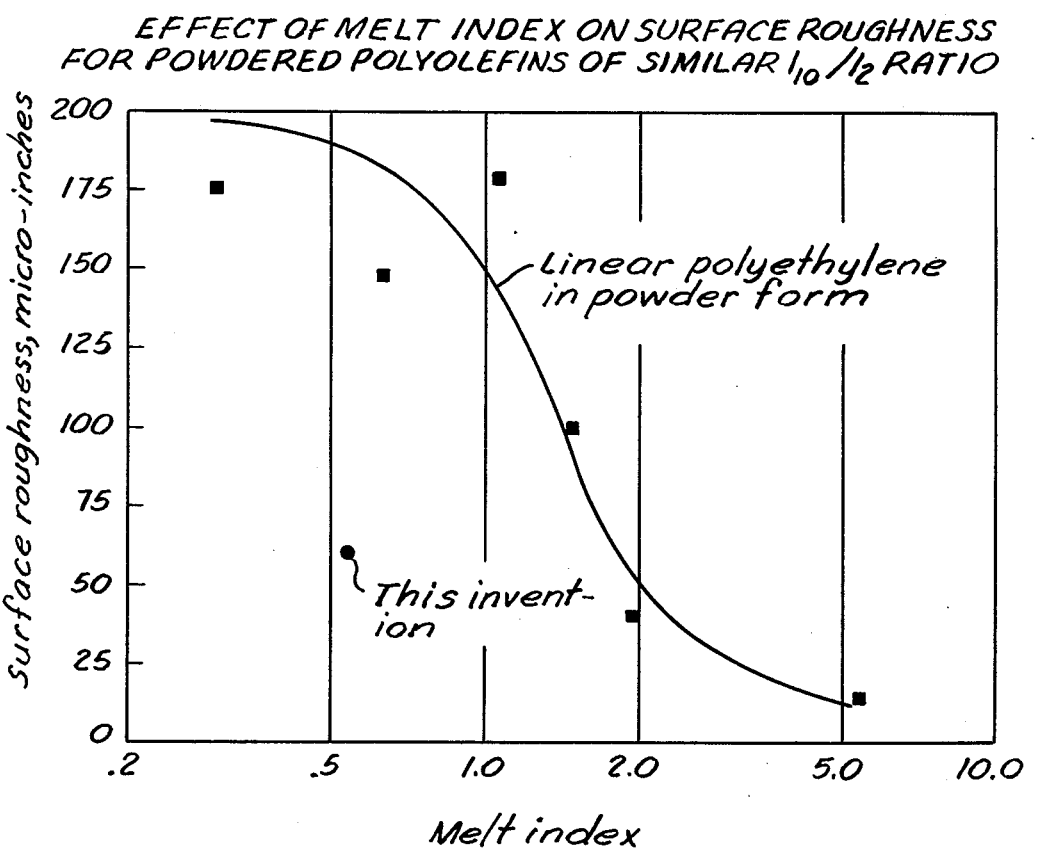

A further illustration of the enhanced processability of the olefin polymers of this invention is presented in the following Table III (and FIG. 2). These data illustrate the effect of melt index on the surface smoothness of linear polyethylenes and the olefin polymers of this invention having approximately the same molecular weight distribution ($I_{10}/I_2$ ratios ranging from 9.7 to 12.6) and melt indexes that vary from 0.30 to 5.53.

TABLE III

EFFECT OF MELT INDEX ON PROCESSABILITY

| Sample No. | Melt Index | $I_{10}/I_2$ Ratio | Line Speed (fpm) | Surface Roughness micro-inches |
|---|---|---|---|---|
| This Invention, Powder | | | | |
| 1 | .55 | 11.8 | 1000 | 60 |
| For Comparison, Powder | | | | |
| 8 | .30 | 12.6 | 1000 | 175 |
| 9 | .64 | 9.7 | 1000 | 150 |
| 20 | 1.09 | 11.3 | 1000 | 180 |
| 21 | 1.46 | 11.2 | 2000 | 100 |
| 22 | 1.93 | 12.1 | 1000 | 40 |
| 23 | 5.53 | 11.9 | 2000 | 15 |

Figure 4:
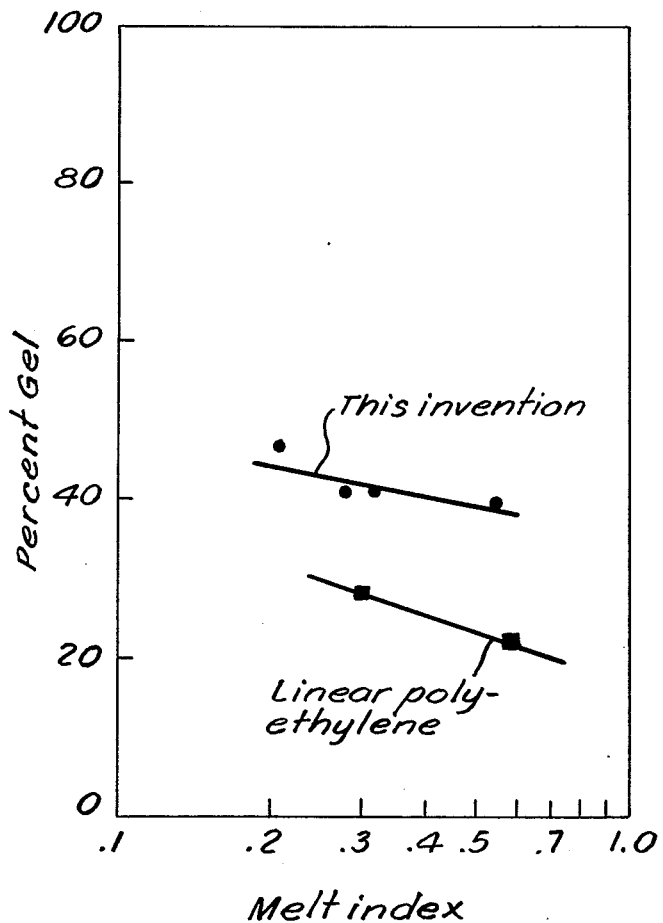

A significant factor in the ability of a olefin polymer to be cross-linked by irradiation is its melt index. Materials of low melt index, especially below about one, are more readily cross-linked with a given radiation dose. Olefin polymers prepared by the process of this invention have melt indexes lower than that of the base resin from which they were prepared (Table I). This fact alone enhances their cross-linking ability. The presence of the chlorine in the olefin polymers of this invention, however, gives an increased measure of cross-linking efficiency not expected for its concentration. These facts are shown in the following Table IV (and FIG. 4) in which percent gel, as determined by solvent extraction per ASTM Test No. D-2765 is given versus melt index of olefin polymers of this invention (Samples 2A, 3A, 7A, 1A) and those of the known art (Samples 8A, 9A) at a radiaiton dose of 12 megarads. By virtue of their significantly higher gel levels, the olefin polymers of this invention exhibit greater sensitivity to irradiation which in practical terms means the attainment of a desired level of properties at a lower cost. It also appears from FIG. 4 that melt index is playing less a role in the response of the olefin polymers of this invention to irradiation than that of the conventional materials.

TABLE IV

EFFECT OF IRRADIATION OF PERCENT GEL

| Sample No. | Melt Index | Percent Gel (ASTM D-2765) Radiation Dose, Megarads | | | | |
|---|---|---|---|---|---|---|
| | | 0 | 6 | 8 | 12 | 16 |
| The Invention, Formulation A | | | | | | |
| 4A | .06 | 1.8 | — | — | — | — |
| 2A | .21 | 0 | 25.8 | — | 46.3 | — |
| 3A | .28 | — | 18.9 | 37.2 | 41.0 | 48.7 |
| 7A | .32 | — | 22.5 | — | 41.8 | — |
| 1A | .55 | — | 15.4 | — | 40.0 | — |
| This Invention, Formulation B | | | | | | |
| 3B | .28 | — | — | 46.3 | — | 62.4 |
| For Comparison, Formulation A | | | | | | |
| 8A | .3 | 0 | 4.8 | 17.7 | 28.2 | 37.6 |
| 9A | .64 | 0 | 1.7 | 10.4 | 22.3 | 39.2 |
| For Comparison, Formulation B | | | | | | |
| 24B* | .66 | — | — | — | 22.1 | 40.3 |

| Formulation A | 100 | parts Polyolefin |
|---|---|---|
| | 1 | part Irganox 1010 |
| Formulation B | 100 | parts Polyolefin |
| | 5 | parts Dibasic Lead Phthalate (Dylhal XL) |
| | 1 | part tetrakis [methylene 3-(3', 5'-di-t-butyl-4'-hydroxyphenyl) propionate] methane (Iraganox 1010) |

*Sample 24B prepared by blending Sample 9, Table II, with chlorinated polyethylene (36% chlorine, 0–2% relative crystallinity) to obtain a blend having 7.5% chlorine by weight. Stabilization Formulation B was used.

Figure 5:
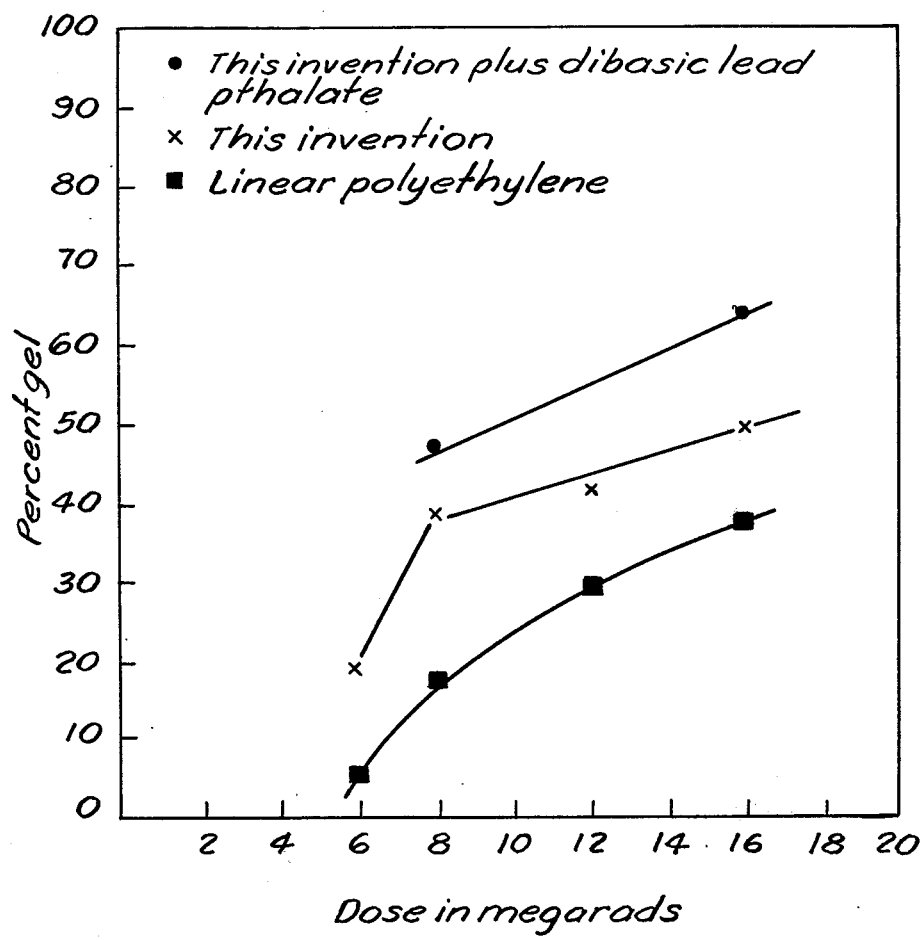

By plotting gel data for Samples 3A, 3B, and 8A from Table IV versus radiation dose in FIG. 5, it can be observed that for materials of similar melt index, the cross-linking efficiency is improved when the olefin polymers of this invention are stabilized with dibasic lead phthalate. Since the olefin polymers of this invention are chlorinated materials, it is beneficial to add this lead compound for stability during heat aging. Thusly, in a form suitable for use as an irradiatable olefin polymer, the olefin polymers of this invention will desirably contain dibasic lead phthalate which will have the added effect of improving the cross-linking efficiency.

Figure 6:
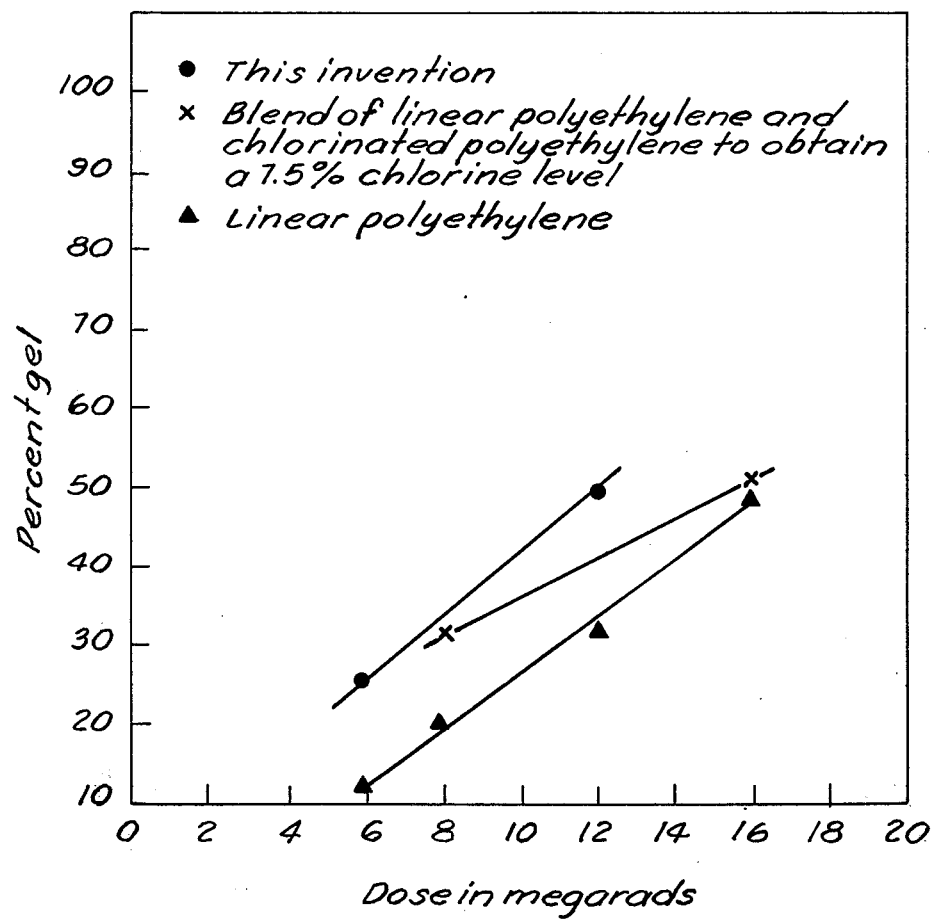

FIG. 6 illustrates that for materials of similar melt index (Sample Nos. 1A, 9A and 24B of Table IV), the olefin polymers of this invention have greater cross-linking ability than that which is obtained by blending a highly chlorinated polyethylene with a linear polyethylene.

The following Table V shows that the olefin polymers of this invention retain their elongation after aging for 168 hours at 150° C. This level of retention would allow these materials to exceed the requirements specified in National Electrical Manufacturer Association (NEMA) WC3 for materials such as nitrile - butadiene/polyvinyl chloride jacketing or chlorsulfonated polyethylene.

TABLE V

EFFECT OF HEAT AGING FOR ONE WEEK AT 300° F ON RETENTION OF INITIAL ELONGATION

| Sample No. | Percent Retention of Initial Elongation Dose | | | | |
|---|---|---|---|---|---|
| | 0 | 4 | 8 | 12 | 16 |
| This Invention, Formulation B (See Note, Table IV) | | | | | |
| 2 | CNT | 118 | 197 | 115 | 137 |
| 3 | CNT | — | 125 | 103 | 110 |
| 4 | CNT | 85 | 113 | 130 | 112 |
| 5 | CNT | CNT | 180 | 107 | 119 |
| For Comparison, Formulation A (See Note, Table IV) | | | | | |

TABLE V-continued

EFFECT OF HEAT AGING FOR ONE WEEK AT 300° F ON RETENTION OF INITIAL ELONGATION

| Sample No. | Percent Retention of Initial Elongation Dose | | | | |
|---|---|---|---|---|---|
| | 0 | 4 | 8 | 12 | 16 |
| 8 | CNT | 100 | 108 | 116 | 121 |
| 9 | CNT | — | 107 | 112 | 119 |
| 10 | CNT | — | 114 | — | 93 |

CNT - Could Not Test. Sample Integrity destroyed during aging.
Note:
Samples aged as Tensile Bars having a thickness of 75 mils. Elongation determined at a crosshead speed of 2 inches/min per ASTM D638.

Table VI shows that the olefin polymers of this invention retain their oxidative stability during the irradiation process. This allows these materials to resist oxidative degradation during use.

TABLE VI

PERCENT RETENTION OF OXIDATIVE STABILITY AFTER IRRADIATION

| Sample No. | Induction Time (min at 425° F) | Percent Retention of Oxygen Induction Time* Dose | | |
|---|---|---|---|---|
| | | 8 | 12 | 16 |
| This Invention, Formulation B (See Note, Table IV) | | | | |
| 2 | 28 | 117 | 82 | 79 |
| 3 | 43 | 70 | 42 | 49 |
| 4 | 32 | 106 | 85 | 47 |
| 5 | 33 | 85 | 73 | 55 |
| For Comparison, Formulation A (See Note, Table IV) | | | | |
| 8 | 85 | 85 | 49 | 48 |
| 9 | 76 | 84 | 82 | 93 |

*Oxygen Induction Time obtained by means of Differential thermal analysis

Table VII illustrates the advantage of dry blending the stabilizers into the olefin polymer as opposed to compounding them in. The insulation on wire coated at 1000 fpm. and a 470° F. melt had a level of stability 34% greater than that of the same material in which the stabilizers were compounded in on a roll mill.

TABLE VII

EFFECT OF PROCESSING ON OXIDATIVE STABILITY

| Sample No. | Preparation | Oxygen Induction Time (minutes at 425° F) |
|---|---|---|
| This Invention, Formulation B* | | |
| 5 | Compounded at 300° F for 5 min. on Roll Mill | 38 |
| 5 | Dry Blended, Extruded Onto Wire at 1000 fpm with a 470° F melt | 51 |

| *Formulation B | 100 parts olefin polymer |
|---|---|
| | 5 parts Dythal XL |
| | 1 part Irganox 1010 |

Table VIII shows some electrical properties of the olefin polymers of this invention and other chlorinated polymers. By virtue of their lower dielectric constant and dissipation factor, the olefin polymers of this invention have lower transmission losses than the conventional chlorinated materials with subsequent economics of operation.

TABLE VIII

SELECTED ELECTRICAL PROPERTIES AT 1 KHz

| This Invention Sample No. | Percent Chlorine | Dielectric Constant (ASTM Test No. D-150-70) | Dissipation Factor (ASTM Test No. D-150-70) |
| --- | --- | --- | --- |
| 5 | 7.6 | 2.74 | .0050 |
| For Comparison, Linear Polyethylene | 0 | 2.29 | .0002 |
| Chlorinated Polyethylene | 36 | 5.96 | .0215 |
| Rigid Polyvinyl Chloride | 57 | 3.10 | .0185 |

What is claimed is:

1. Electrical insulation formed from a normally solid, linear polyethylene containing from about 1 to about 20 percent by weight chlorine chemically combined therewith said polyethylene having a bulk density of from about 22 to about 36 pounds per cubic foot and wherein the individual particles of said polymer are predominently in the range of from about 300 to about 800 microns in size, said polyethylene additionally being characterized by a melt index of from about 0.05 to about 2 as determined by ASTM Test No. D-1238, Procedure A and a tensile yield strength of greater than about 1000 p.s.i. wherein said polyethylene is chlorinated by reacting said polyethylene while in substantially dry, powdered form with gaseous chlorine in the substantial absence of oxygen at temperatures not substantially exceeding 90° C, while holding said polyethylene in a fluidized bed state.

2. The electrical insulation of claim 1 wherein said insulation is cross-linked by exposure to atomic radiation.

3. The electrical insulation of claim 2 wherein said cross-linking takes place in the absence of added sensitizing monomers.

4. The electrical insulation of claim 1 in the form of an electrically insulating coating for wire.

* * * * *